(12) United States Patent
Dahlman

(10) Patent No.: US 9,097,278 B2
(45) Date of Patent: Aug. 4, 2015

(54) BEARING RING WITH AN ADDITIONAL COMPONENT AND METHOD FOR PRODUCING SUCH A BEARING RING

(75) Inventor: Patrik Dahlman, Partille (SE)

(73) Assignee: AKTIEBOLAGET SKF, Gothenburg (SE)

( * ) Notice: Subject to any disclaimer, the term of this patent is extended or adjusted under 35 U.S.C. 154(b) by 85 days.

(21) Appl. No.: 13/807,969

(22) PCT Filed: May 27, 2011

(86) PCT No.: PCT/SE2011/000098
§ 371 (c)(1),
(2), (4) Date: Jan. 2, 2013

(87) PCT Pub. No.: WO2012/002867
PCT Pub. Date: Jan. 5, 2012

(65) Prior Publication Data
US 2013/0098175 A1 Apr. 25, 2013

(30) Foreign Application Priority Data
Jul. 2, 2010 (SE) ...................................... 1000723

(51) Int. Cl.
| | |
|---|---|
| *F16C 33/00* | (2006.01) |
| *F16C 19/00* | (2006.01) |
| *G01G 9/00* | (2006.01) |
| *B23K 11/04* | (2006.01) |
| *F16C 33/64* | (2006.01) |
| *F16C 41/00* | (2006.01) |

(52) U.S. Cl.
CPC ................. *F16C 33/00* (2013.01); *B23K 11/04* (2013.01); *F16C 19/00* (2013.01); *F16C 33/64* (2013.01); *F16C 41/008* (2013.01); *B23K 2201/30* (2013.01); *F16C 2220/44* (2013.01); *F16C 2226/36* (2013.01)

(58) Field of Classification Search
CPC ........ F16C 33/00; F16C 41/008; F16C 19/00; F16C 33/64; F16C 2226/36; F16C 2220/44; B23K 11/04; B23K 2201/30
USPC .................. 384/91, 448; 228/173.1; 73/865.8
See application file for complete search history.

(56) References Cited

U.S. PATENT DOCUMENTS

| | | |
|---|---|---|
| 1,967,821 A | 7/1934 | Hess |
| 3,387,900 A | 6/1968 | Morrison |
| 3,619,547 A | 11/1971 | Cavagnero |
| 3,692,374 A | 9/1972 | Scheifele |

(Continued)

FOREIGN PATENT DOCUMENTS

| | | |
|---|---|---|
| CN | 1221791 C | 10/2005 |
| CN | 1993562 A | 7/2007 |

(Continued)

*Primary Examiner* — Lisa Caputo
*Assistant Examiner* — Philip Cotey
(74) *Attorney, Agent, or Firm* — Bryan Peckjian; SKF USA Inc. Patent Dept.

(57) ABSTRACT

The invention relates to a bearing ring produced from a straight profile bar that is bent to an annular shape and where the bearing ring is joined in a flash butt welding process, and where the bearing ring further comprises an additional component enclosed within the bearing ring material. The invention further relates to a method for producing such a bearing ring from a straight profile bar. The advantage of the invention is to obtain a bearing ring with completely enclosed additional component in a simple and cost-effective way.

16 Claims, 2 Drawing Sheets

(56) References Cited

U.S. PATENT DOCUMENTS

| | | | |
|---|---|---|---|
| 5,727,317 A * | 3/1998 | Bekku et al. | 384/625 |
| 6,920,801 B2 * | 7/2005 | Van Leeuwen et al. | 73/862.49 |
| 7,394,395 B2 * | 7/2008 | Sakatani et al. | 384/91 |
| 7,486,178 B2 * | 2/2009 | Criaud et al. | 384/91 |
| 2004/0261543 A1 * | 12/2004 | Van Leeuwen et al. | 73/862.49 |
| 2005/0259903 A1 * | 11/2005 | Takizawa et al. | 384/448 |
| 2007/0115131 A1 * | 5/2007 | Seriu et al. | 340/572.8 |
| 2008/0133100 A1 * | 6/2008 | Takahashi et al. | 384/91 |
| 2008/0170817 A1 * | 7/2008 | McDearmon | 384/448 |
| 2011/0032160 A1 * | 2/2011 | Rink | 343/767 |

FOREIGN PATENT DOCUMENTS

| | | |
|---|---|---|
| DE | 102004054201 A1 | 5/2006 |
| DE | 102005014967 A1 | 10/2006 |
| DE | 102008016790 A1 | 10/2009 |
| EP | 1615091 A1 | 1/2006 |
| EP | 1788266 A1 | 5/2007 |
| JP | S4515873 Y1 | 7/1970 |
| JP | 2003083774 A | 3/2003 |
| JP | 2004263724 A | 9/2004 |

* cited by examiner

BEARING RING WITH AN ADDITIONAL COMPONENT AND METHOD FOR PRODUCING SUCH A BEARING RING

CROSS-REFERENCE TO RELATED APPLICATION

This application is a National Stage application claiming the benefit of International Application Number PCT/SE2011/000098 filed on 27 May 2011, which claims the benefit of SE Application 1000723-5 Filed on 2 Jul. 2010.

TECHNICAL FIELD

The present invention relates to a roller bearing ring comprising an additional component enclosed in the ring material. The invention further relates to a method for producing a bearing ring with an enclosed additional component in a cost-effective way.

BACKGROUND ART

Bearings are generally used to support and hold a rotating member attached to a non-rotating member. This can be e.g. a wheel on a vehicle, a vane on a wind turbine or a drum in a washing machine. During use, the bearing is subjected to different loads, both static and dynamic. The static load is mainly due to the weight of the machine, while the dynamic loads are due to the working conditions of the machine.

In order to monitor the loads and stresses imposed on a bearing, displacement sensors may be used. One type of displacement sensor used for this type of measurement is strain gauges. One or more strain gauges are attached to the outer or inner bearing ring in order to detect the load imposed on the bearing. In some cases, one or more sensors mounted on the housing in which the bearing is mounted or on the axle held by the bearing can also be used to detect the loads imposed on the bearing.

It is also possible to mount a sensor in a hole in the bearing ring in order to monitor the loads imposed on the bearing. Such a mounting is advantageously used on larger bearings, where the drilling of a hole does not influence the strength of the bearing ring. Still, the mounting of a sensor in such a way requires several operations to be performed. The sensor is further subjected to environmental influences, which in some cases may be very severe. There may also be a need to include other components in a bearing ring. Such a component may be a magnetic material that cooperates with a hall sensor positioned outside of the bearing or an identification means, such as a RFID tag. Those components will also be subjected to environmental influences.

There is thus room for an improved mounting method of a sensor or the like in a bearing ring.

DISCLOSURE OF INVENTION

An object of the invention is therefore to provide a bearing ring comprising an enclosed additional component. A further object of the invention is to provide a method for mounting an additional component in a bearing ring.

The solution to this problem according to the invention is described in the characterizing part of claim 1 regarding the bearing ring and in claim 11 regarding the production method. The other claims contain advantageous embodiments and further developments of the bearing ring and the method according to the invention.

With a bearing ring produced from a straight profile bar that is bent to an annular shape and where the bearing ring is joined in a flash butt welding process, the object of the invention is achieved in that the bearing ring further comprises an additional component enclosed within the bearing ring material.

By this first embodiment of the bearing ring according to the invention, a bearing ring is provided in which an additional component is completely enclosed in the bearing ring material. Such an additional component is by the invention protected from any environmental influences that would otherwise be detrimental for the additional component. Further, the additional component is completely tamper-proof. By using an identification means as an additional component, it will thus be possible to detect the identity of a specific bearing ring through the complete life of the bearing ring. A further advantage of this is the possibility to certify that a bearing comprising the bearing ring is an original bearing produced by the stated manufacturer, which will be helpful for anti-counterfeiting purposes.

In an advantageous further development of the bearing ring according to the invention, the additional component is positioned in a cavity enclosed within the bearing ring material. The use of a cavity is preferred when the additional component is a sensor or the like, since it is easier to protect the additional component during the joining of the bearing ring. A cavity also enables the mounting of a sensor in a somewhat resilient way, which may protect the sensor further. The interior of the cavity may be closed with a cover before the joining of the bearing ring. This will further protect the additional component during the joining of the bearing ring.

In an advantageous further development of the bearing ring according to the invention, the additional component is a piece of material with another composition than the bearing ring material. This is advantageous in that the additional component may be robust and relatively insensitive for the temperature and the pressure of the flash butt welding used to join the bearing ring. This will thus facilitate the joining of the bearing ring.

In an advantageous further development of the bearing ring according to the invention, the additional component is an identification means adapted to identify the specific bearing ring. Such an additional component may be of different kinds and may in one example comprise different materials that can be detected from outside of the bearing ring. In another example, the identification means is an electronic component comprising a identification number, e.g. a RFID tag or the like using electromagnetic radiation for the reading of the identification number.

In an advantageous further development of the bearing ring according to the invention, the additional component is a sensor or a sensor module comprising electronic components. Examples of sensors are load sensors, temperature sensors or acceleration sensors. The signal from the sensor may either be transmitted directly as it is or may be processed in the sensor module before it is transmitted. The signals may be transmitted through a connection extending through the bearing ring material, which in turn is connected to a control unit. The signals may also be transmitted through a wireless communication means, e.g. by using electromagnetic radiation.

In an advantageous further development of the bearing ring according to the invention, the additional component comprises a power generating means adapted to provide power to the sensor, to the sensor module and/or to the communication means. This is advantageous in that the components may be powered throughout the entire life of the bearing ring.

In an advantageous further development of the bearing ring according to the invention, the annular member comprises a plurality of ring segments that are flash butt welded together. The annular member may comprise two semi-circular ring segments welded together at one end to form the annular member or more ring segments also welded together to form the annular member. It is also possible that two or more ring segments are welded together at the same time, thereby forming the bearing ring directly. This is of advantage since shorter bar segments are easier to handle and to form, e.g. to bend to a circular shape.

In the inventive method for producing a bearing ring comprising an additional component enclosed in the bearing ring, comprising the steps of bending or forming a straight profile bar to an annular member or to a ring segment, placing the additional component between the two end surfaces of the annular member or between two end surfaces of the ring segments, and welding the two end regions of the annular member or the ring segments together by flash butt welding are comprised.

By this first embodiment of the method according to the invention, a method is provided, in which an additional component is completely enclosed in the bearing ring material. The advantage of this method is that an additional component can be mounted in a bearing ring in a way that is both completely sealed and completely tamper-proof.

In another embodiment of the inventive method for producing a bearing ring comprising an additional component enclosed in the bearing ring, the steps of forming a cavity in at least one end region of a straight profile bar, bending the straight profile bar to an annular member, placing the additional component in the cavity of the annular member and welding the two end regions of the annular member together by flash butt welding are comprised.

BRIEF DESCRIPTION OF DRAWINGS

The invention will be described in greater detail in the following, with reference to the embodiments that are shown in the attached drawings, in which.

MODES FOR CARRYING OUT THE INVENTION

The embodiments of the invention with further developments described in the following are to be regarded only as examples and are in no way to limit the scope of the protection provided by the patent claims.

Figure 1:
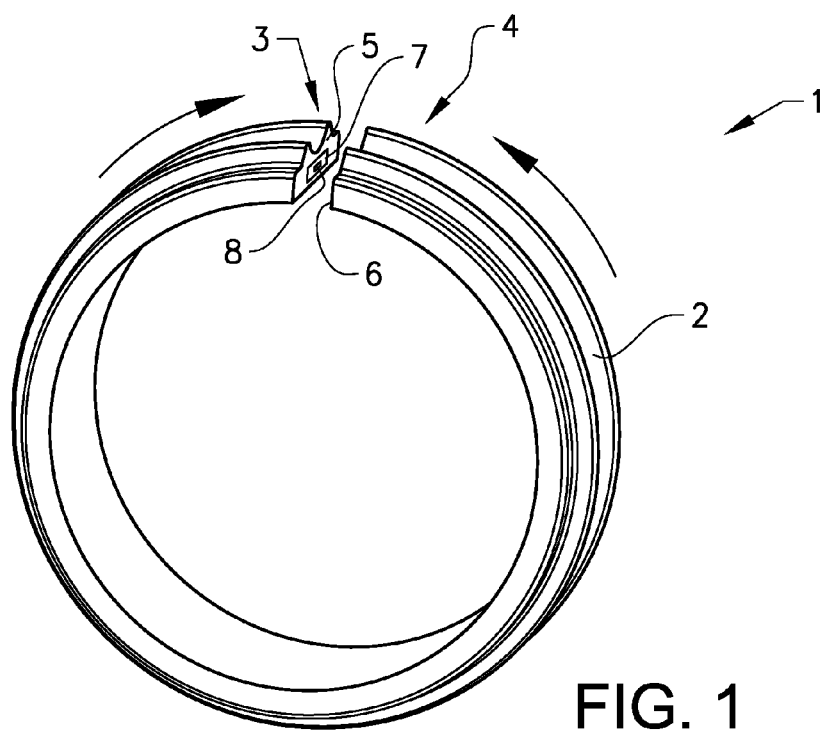
FIG. 1 shows a profiled bar formed as a ring prior to the joining of the bearing ring according to the invention.
Figure 2:
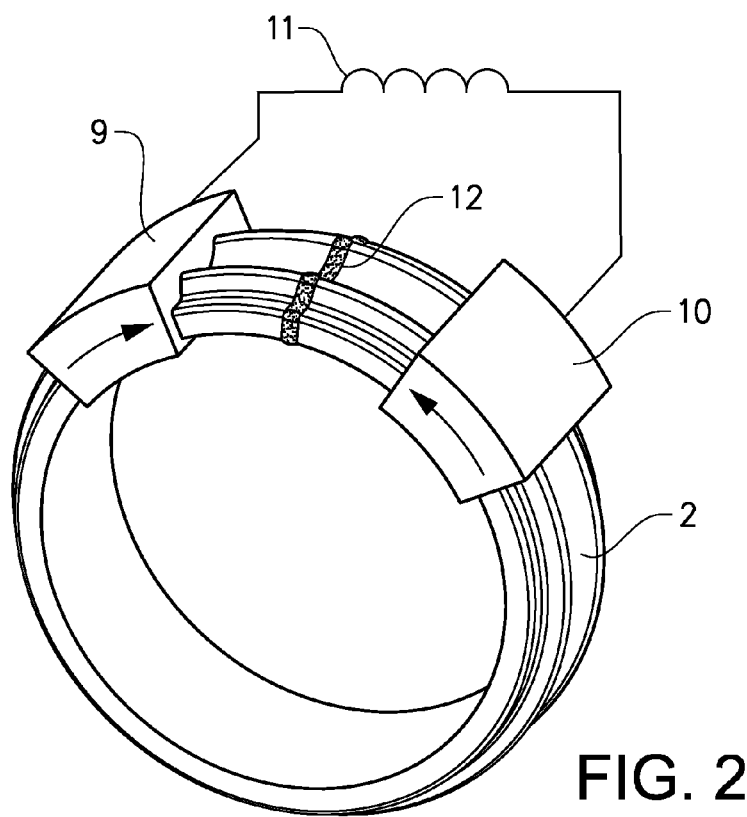
FIG. 2 shows the profiled bar during the joining of the bearing ring according to the invention.

FIGS. 1 and 2 show an example of the joining of a bearing ring. In the shown example, the two end regions of an inner bearing ring are joined together. An outer bearing ring is made in the same way. The bearing ring 1 is formed by a straight profiled bar 2 that is bent to an annular member having a first end region 3 with a first end surface 5 and a second end region 4 with a second end surface 6 abutting each other. In the shown example, a cavity 7 is provided in the first end surface. An additional component 8 is provided in the cavity. The additional component may be one of several different types, such as a sensor, a sensor module, an identification tab, a piece made from a specific material that differs from the material of the bearing ring, a magnet or other. The additional component will be described below.

The bearing ring is placed in a flash butt welding machine having a first clamping tool 9 and a second clamping tool 10. The clamping tools are connected to the secondary coil 11 of a welding transformer that will provide the current for the flash butt welding. Before the welding, the two end regions are pushed against each other by the clamping tools. During the welding, electric power is applied to the clamps and the end regions will heat up rapidly due to the electric power. At the same time, the clamps are pushed further together, thereby creating a joint in the weld zone 12 joining the bearing ring. During the flash butt welding, the end surfaces will be heated up and some excessive material will be pushed out to the sides of the weld zone by the pressure exerted by the clamping tools. The excessive material will comprise impurities and oxidized material which are thus forced out of the weld zone, leaving a joint with essentially the same characteristics as the rest of the bearing ring material. The excessive material is machined away in a later operation, leaving a bearing ring with the same cross section all around. Since no filler material is used, the composition of the material will be the same throughout the entire bearing ring. By heat treating the bearing ring, the mechanical properties will also even out throughout the material, such that a bearing ring consisting of a homogeneous material without any weaker regions is obtained.

Regular welding using filler materials will not give a satisfactory result when welding bearing rings together. The filler material will inevitably create a joint region with different characteristics that will constitute a weak point of the bearing ring. Such a bearing ring may possibly be used for low cost and low performance roller bearings. Another advantage of using flash butt welding is that since the end regions are pressed together and the material will flow some, the end surfaces must not be completely parallel prior to the welding. Thus, the cut of the profiled bar must not be exactly correct and bearing rings having different diameters can use the same angular cut.

The additional component is enclosed in the bearing ring during the joining of the end regions. After the welding, the additional component will be completely enclosed in the bearing material. Since the material properties of the bearing ring are the same as for the joint, the position of the additional component may be concealed if required. Depending on the type of additional component, it may thus be impossible to see that an additional component is enclosed in the bearing ring. If the additional component requires connections, the connecting point or points will be visible.

An inventive bearing ring with an enclosed additional component is advantageously used for larger bearing rings, having an inner diameter in the region of above 0.5 meters and more. One reasons for this is that such large bearing rings are expensive to produce from a single block of material, since the complete bearing ring must be machined from the single block. A further reason is that the additional component will be relatively small compared to the cross section of the larger bearing rings. In this way, the additional component will not affect the strength of the bearing ring to any significant extent. If the cavity for the additional component is designed such that there will be an enclosed cavity after the flash butt welding, the cavity will also not affect the strength significantly.

Figure 3:
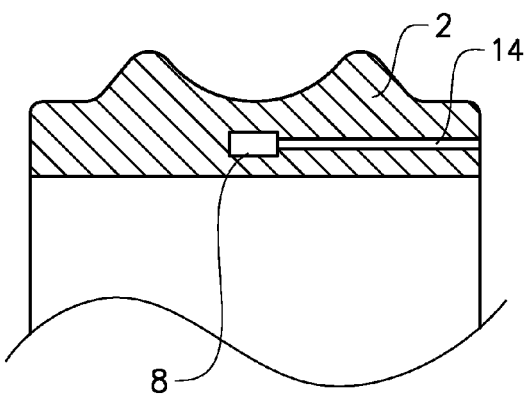
FIG. 3 shows a split view of a bearing ring with an additional enclosed component according to the invention.

Different types of additional components may be used, depending on the requirements. In a first embodiment of the inventive bearing ring, the additional component is a single sensor. It may e.g. be a ceramic temperature sensor that can withstand the temperature it is exposed to during the welding process. FIG. 3 shows a cross-cut of the bearing ring with an additional component 8 in the form of an enclosed sensor having a connection 14 that exits the bearing ring trough the side wall of the bearing ring. In the shown example, the sensor may be placed in a cavity before the annular member is joined. The cavity for the sensor and the connection is designed such that the sensor and the connection are not pushed out of the bearing ring with the excessive material. The cavity will in this example be filled by the molten steel during the welding, such that the sensor is completely enclosed in the material of the bearing ring. The connection is preferably also made from or protected by a ceramic material such that it can withstand the temperature and the pressure of the welding process. In this way, an enclosed sensor with connections is integrated in the bearing ring in an easy and cost-effective way. The sensor will be completely protected from the environment in which the bearing is mounted.

Another additional component that can be enclosed in the bearing ring is a piece made from a material that differs from the material of the bearing ring. Such a material may be e.g. a magnetic material, a material having a different density or a material having different magnetic properties. Such a material enclosed in the bearing ring can be detected by a sensor mounted outside of the bearing ring. Such an additional component can e.g. be used as a revolution counter that detects each passing of the additional component. By enclosing a piece made from a material that changes its properties due to environmental influences such as load or temperature, the variation in the enclosed material can be detected by a sensor mounted outside of the bearing ring.

A further use of an additional component consisting of a piece of material that differs from the material of the bearing ring is to identify different types of bearing rings by the enclosed additional component. In this way, a tamper-proof identification of different bearing rings is obtained. One such use may be bearing rings having different material properties such as different degrees of hardness. A type having a high degree of hardness will then comprise a piece made from a first material and another type having a lower degree of hardness will comprise a piece made from a second material. The enclosed material can be detected by an external sensor and the type of bearing ring can be controlled. In this way, it is possible to investigate if a specific bearing type has been used in the right location and for the right application.

It is also possible to enclose an additional component that will act as part of an external sensor. It is e.g. possible to create a capacitive sensor having one side enclosed in the bearing ring and one side external of the bearing ring. Also magnetic sensors may cooperate with an enclosed additional component.

Another type of additional component is an electronic passive component that can be read from the outside, such as a RFID component or the like. Such a component may e.g. comprise an identification number that can be read in a contactless manner. The identification number may indicate the type of bearing, the production date or be a unique individual identification number. In this way, each individual bearing may be identified. The identification number is tamper-proof since it is completely enclosed in the bearing ring material and can not be removed or exchanged without leaving traces. This will help in investigations regarding counterfeit products.

Figure 4:
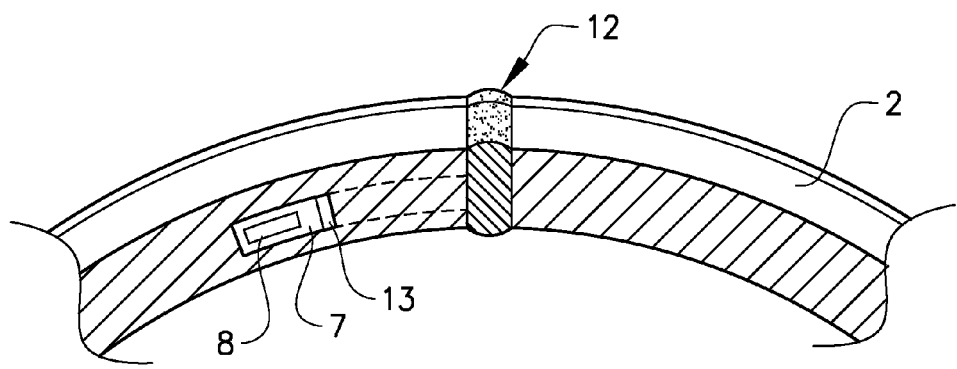
FIG. 4 shows a split view of a bearing ring with an additional enclosed component in a cavity according to the invention.

It is also possible to enclose more advanced additional components, such as intelligent sensors, active components comprising a transmitter and even components that are adapted to self-generate energy for the integrated circuit. Such components are more sensitive for heat and pressure and must thus be protected during the flash butt welding process. One way of protecting the additional component from the molten material of the joint is to make the cavity for the additional component relatively deep such that the additional component will not come in contact with the molten material. In FIG. 4, an additional component 8 mounted in a cavity 7 with a protective cover 13 is shown. The cover is inserted in front of the inner part of the cavity and will protect the cavity and the additional component during the welding. The outer part of the cavity, between the cover and the weld zone, may be filled with molten during the welding. The additional component may also be protected in an enclosure that will withstand the pressure and temperature. The enclosure may e.g. be made from a ceramic material and may comprise a thermos function with double walls that will enhance the protection. Another way of protecting the additional component is to cool down the additional component to a very low temperature, e.g. with liquid nitrogen, and then to place the additional component in the enclosure. Since the flash butt welding is a relatively quick operation, the additional component will in this example not heat up excessively during the welding process. The enclosure may be designed to protect the additional component sufficiently even if the enclosure itself is damaged.

Some additional components may also be enclosed in the material of the bearing ring without the use of a cavity. Especially smaller components or additional components in the form of a piece of material of another kind than the material of the bearing ring may be positioned between the end surfaces of the annular member before the welding, and may remain in this position during the flash butt welding. It is of course important to design the additional component in such a way that the additional component is not forced out of the joint together with the excessive material.

The cavity may be somewhat elongated such that a somewhat elongated component can be used. One example of an elongated additional component is an elongated bar comprising a plurality of magnets positioned along the bar with a distance between each magnet. When enclosed in a bearing ring, an external sensor can detect the magnets passing by when the bearing ring rotates which will give an indication of the rotational speed of the bearing ring. The elongated additional component may also comprise a plurality of spaced apart pieces made from a material differing from the material of the bearing ring. These pieces may also be detected by an external sensor, e.g. a magnetic sensor, for the same purpose.

An elongated additional component in the form of a sensor module may also comprise an elongated coil that is adapted to cooperate with an external magnet positioned outside of the bearing ring. When the coil passes the magnet, a current is induced which can be used to power the sensor module and/or a transmitter/receiver integrated in the sensor module. In this way, the sensor module is self powered which is of advantage since it is impossible to exchange a battery. Other ways of powering an enclosed sensor module are also possible, such as a capacitive powering means or to power the sensor module by electromagnetic radiation.

The cavity may extend through part of the profile bar. Such a cavity may e.g. be made by drilling, milling, or a spark cutting process. This enables an additional component to be inserted into the cavity at a distance from the welded joint. In this way, the additional component will not be exposed to the temperature and the pressure of the flash butt welding process at the same extent than when the additional component is positioned at the end region of the annular member. The additional component may also in this example be protected by a cover and/or protective enclosure. This will allow the use of components that are more sensitive for high temperatures.

In a second embodiment, the annular member comprises two or more ring segments that are flash butt welded together to form the annular member. In this embodiment, an additional component may be placed in each weld zone, such that two additional components may be enclosed in the bearing ring when the bearing ring is made from two semicircular segments. One advantage of having two oppositely positioned additional components is that e.g. the resolution may be higher when the additional components are used for rotational speed detection. It is also possible to enclose different additional components in the different joints. The bearing ring may of course also be made from more than two segments, such as three 120 degrees segments or four 90 degrees segments. One reason for using several ring segments is that it may be easier to produce the smaller ring segments, e.g. to bend a shorter segment 90 degrees is easier than to bend a longer segment 360 degrees. This will also make it easier to provide a high accuracy for the bearing ring, especially for the roundness of the bearing ring. The two or more ring segments may be flash butt welded at the same time to form the bearing ring directly or may be welded consecutively, one after the other, to form the annular member.

One advantage of the inventive method is that an additional component can be completely enclosed in the bearing ring material during the joining of the two end regions of the annular member. The creation of a cavity for the additional component, e.g. through machining, is easier to make on the straight profile bar before the profile bar is bent to an annular member. The cavity can thus be made in one or both end regions when the profile bar is straight, which simplifies the handling of the profile bar and the access for the tools to the end surface. A further advantage is that the profile bar material is easier to machine than a ready bearing ring, since the profile bar is not hardened. Depending on the type of cavity required, it is even possible to press or stamp a suitable cavity in the end region of the profile bar in a single operation. The cavity may also extend through the complete profile bar.

Another advantage is that an additional component can be integrated in the bearing ring without affecting the strength of the bearing ring. A sensor or the like that is mounted in the bearing ring from the outside will require a hole in the outer surface of the bearing ring, which will affect the strength of the bearing ring, at least to some extent. In the invention, the additional component is completely enclosed in the inner material of the bearing ring, which does not affect the strength significantly. By placing the cavity for the additional component in the middle of the cross-section of the profile bar in a symmetrical way, the influence of the cavity on the strength of the bearing ring will be insignificant.

The additional component will also be securely mounted inside the bearing ring by the inventive method. There is no risk of the additional component falling out or that the additional component is damaged or is subjected to environmental influences, such as corrosive substances. Further, the mounting of the additional component is simplified since the number of required operations is reduced.

Figure 5:
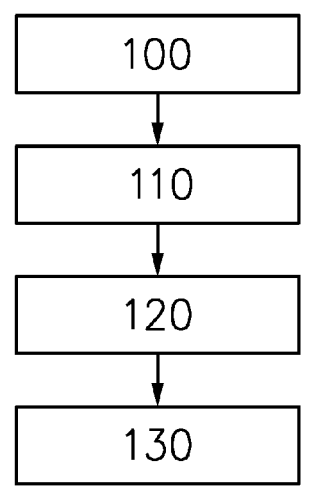
FIG. 5 shows a flow chart of the inventive method.

An embodiment of the inventive method for producing a bearing ring comprising an additional component enclosed in the bearing ring is described by the flow chart of FIG. 5. In the first step 100, a cavity is formed in at least one end region of the straight profile bar prior to the bending of the straight profile bar. The cavity may extend through the complete length or part of the length of the profile bar. The straight profile bar may be manufactured in different ways, as described above. If no cavity is required for the additional component, this step is left out.

In step 110, the straight profile bar is bent to an annular member having substantially the same shape as the bearing ring will have after the joining of the two end regions. The annular member may be bent either such that the end surfaces are preloaded against each other or such that there is a small distance between them before the joining has started. The annular member may also comprise two or more ring segments that is welded together to form an annular member.

In step 120, the additional component is placed between the end surfaces of the annular member or in the cavity. Depending on the type of additional component, it is also possible to insert the additional component in the cavity prior to the bending of the annular member. Some additional components may not withstand the bending and are thus inserted after the bending. Especially for elongated additional components, it is of advantage to insert them prior to the bending.

In step 130, the two end regions of the annular member are welded to each other by a flash butt welding process.

It is also possible to leave out the cavity for an additional component that is held in place between the two end surfaces during the flash butt welding. The bearing ring may also comprise a plurality of ring segments.

The invention is not to be regarded as being limited to the embodiments described above, a number of additional variants and modifications being possible within the scope of the subsequent patent claims.

REFERENCE SIGNS

1: Bearing ring
2: Profile bar
3: First end region
4: Second end region
5: First end surface
6: Second end surface
7: Cavity
8: Additional component
9: First clamping tool
10: Second clamping tool
11: Coil
12: Weld zone
13: Cover
14: Connection

The invention claimed is:

1. A bearing ring produced from a straight profile bar that is bent to an annular member having two end surfaces and where the two end surfaces are joined in a flash butt welding process, the bearing ring comprising:
   a bearing ring material;
   an additional component positioned in a cavity enclosed within the bearing ring material; and
   a weld zone sealing the cavity.

2. The bearing ring according to claim 1, wherein the cavity is positioned one of in or adjacent to the weld zone.

3. The bearing ring according to claim 1, wherein the cavity extends from at least one end surface of the annular member.

4. The bearing ring according to claim 3, further comprising a cover, wherein an interior of the cavity is closed with the cover.

5. The bearing ring according to claim 1, wherein the additional component is fabricated of a piece of material having a composition than differs from a composition of the bearing ring material.

6. The bearing ring according to claim 1, further comprising an identification feature applied to the additional component, wherein the identification feature is adapted to identify the specific bearing ring.

7. The bearing ring according to claim 1, wherein the additional component comprises a sensor.

8. The bearing ring according to claim 7, the additional component further comprising a sensor module, the sensor contained therein.

9. The bearing ring according to claim 7, the sensor further comprising electrical connections, wherein the electrical connections extend through the bearing ring material.

10. The bearing ring according to claim 7, further comprising a wireless communication system in signal communication with the sensor.

11. The bearing ring according to claim 7, further comprising a power generating device adapted to provide power to at least one of:
   the sensor,
   a sensor module, the sensor contained therein,
   a communication device that is in signal communication with the sensor, and
   a wireless communication system in signal communication with the sensor.

12. The bearing ring according to claim 1, wherein the annular member comprises a plurality of ring segments that are flash butt welded together.

13. The bearing ring according to claim 1, further comprising a second ring assembled in rotational engagement with said bearing ring.

14. The bearing ring according to claim 1, wherein the weld zone has a composition that is homogeneous with the bearing ring material.

15. The bearing ring according to claim 1, wherein the weld zone has the same characteristics as the bearing ring material.

16. The bearing ring according to claim 1, wherein the weld zone is substantially free of impurities.

* * * * *